Dec. 30, 1930.  R. R. BRYAN  1,787,033
METHOD FOR RECOVERING CYANIDES
Filed June 2, 1926
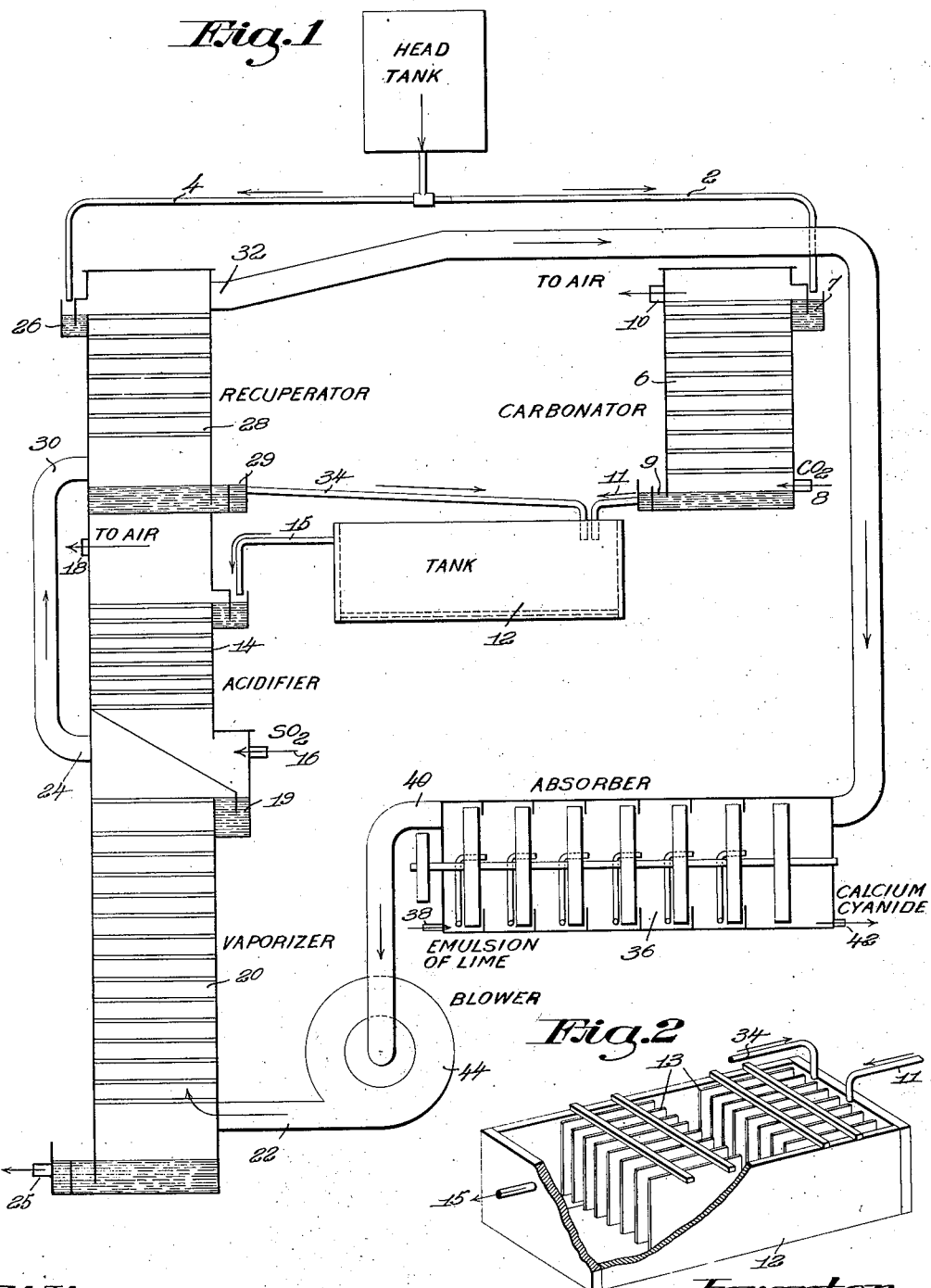

Patented Dec. 30, 1930

1,787,033

UNITED STATES PATENT OFFICE

RUSSELL R. BRYAN, OF PACHUCA, HIDALGO, MEXICO, ASSIGNOR, BY MESNE ASSIGNMENTS, TO THE MERRILL COMPANY, OF SAN FRANCISCO, CALIFORNIA, A CORPORATION OF CALIFORNIA

METHOD FOR RECOVERING CYANIDES

Application filed June 2, 1926. Serial No. 113,174.

The present invention relates to methods for recovering cyanide from cyanide solutions.

Waste mill solutions and solutions from tailing deposits contain a small amount of cyanide, usually in the form of double cyanides of zinc and simple cyanides of alkaline earth metals, which it is desirable to recover. The usual method of recovering the cyanide comprises three steps; first, acidification, second, vaporization, and third, absorption. The first step consists in treatment of the solution with an acid to convert the cyanide salt into hydrocyanic acid. The second step consists in the removal of the relatively volatile hydrocyanic acid from the solution by vaporization, usually in a current of air. From the vaporizing step, the hydrocyanic acid gas passes to an apparatus where it is absorbed in an alkaline solution, conveniently sodium hydroxide or an emulsion of lime, constituting the third step of the method.

This method ordinarily carried out is open to several disadvantages. Principal among these is the fact that the acidifying step requires not only a sufficient amount of acid to liberate the hydrocyanic acid gas, but first an additional amount to neutralize what is termed the protective alkalinity of the solution which is always present to protect the cyanides from any possible acidification in the process. An acid anhydride may be used in the acidifying step and one which commends itself because of its cheapness is carbon dioxide. The reactions involved in the acidifying step are represented by the following two equations, the first of which has to do with the neutralization of the protective alkalinity of the solution and the second with the liberation of hydrocyanic acid:

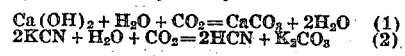

$$Ca(OH)_2 + H_2O + CO_2 = CaCO_3 + 2H_2O \quad (1)$$
$$2KCN + H_2O + CO_2 = 2HCN + K_2CO_3 \quad (2)$$

In the above equations it is assumed that the protective alkalinity of the solution is afforded by lime and that the cyanide which it is desired to recover is in the form of the simple potassium salt although these compounds will vary, and will in general be more complex, for solutions arising in practice. Because of the insolubility of calcium carbonate, the reaction represented by Equation (1) will proceed to completion toward the right hand side. However, the reaction represented by Equation (2) contains volatile constituents on each side, namely, carbon dioxide and hydrocyanic acid gas and the reaction will, therefore, not proceed to completion because an attempt to vaporize one of these constituents will result in some vaporization of the other. The equation, therefore, does not show the exact balance reached by the reagents, which balance can only be determined by actual experiment. It has been shown that only when prohibitive excesses of carbon dioxides are used does the decomposition of the cyanide salt approach completion, the relative vapor tensions of the carbon dioxide and hydrocyanic gas being such that greater amounts of the former are vaporized than of the latter. It will be seen, therefore, that unless very considerable excesses of carbon dioxides are used, the reaction will tend to reach equilibrium with a considerable quantity of the cyanide salt remaining in solution, without being converted into a form in which it can be recovered. Moreover, the presence of carbon dioxide in the vaporizing step presents a further disadvantage in that in being subsequently passed through the absorber it reacts with the alkali used as the absorbing medium to form an insoluble carbonate, a reaction which not only requires the use of an excessive amount of alkali for absorption purposes, but also results in precipitation of a carbonate in the absorber with consequent choking of the latter.

The use of a stronger and less volatile acid anhydride than carbon dioxide in the usual cyanide recovering process might be preferable except for the fact that its expense is prohibitive, because a large proportion thereof must be used to neutralize the protective alkalinity of the solution without effecting any useful decomposition of the cyanides. Sulphur dioxide which forms a useful acid anhydride gas for acidifying purposes is stronger than carbon dioxide and is also less volatile, thus permitting the reaction represented by Equation (2) to proceed further toward completion on the right hand side, but it nevertheless volatilizes to some extent with the hydrocyanic acid gas and aside from the question of expense it presents the same difficulty as carbon dioxide in combining with the alkali of the absorber to give the choking effect by precipitation of an insoluble sulphite.

In actual mill solutions a further difficulty appears which is not represented in the above equation, namely, the presence of double cyanides such as the double cyanide of potassium and zinc represented by the formula: $K_2Zn(CN)_4$. The acidification of such complex cyanides with volatile acid anhydrides requires a greater excess of such acid anhydrides to give complete liberation of hydrocyanic acid than is the case with simple cyanides. In the case of some of the weaker acids ordinarily available for acidifying purposes, their vapor tensions at ordinary temperatures are considerable and large excesses are necessary for practical recovery of cyanide, but when these large excesses are employed there is a greater vaporization thereof along with the hydrocyanic acid in the vaporizing step, thus reducing the excess acidity of the remaining solution, which action in turn necessitates a still greater excess acidity of the original solution in order to maintain the required acidity of the solution toward the end of the vaporizing step.

Moreover, even when strong acids are employed for the acidifying step, additional troubles are introduced by the liberation of carbon dioxide from the carbonates which are always present in the mill solution. This gas then is free to pass into the absorber with the hydrocyanic acid gas, where it absorbs the useful alkali and gives rise to an undesirable precipitation of carbonate, resulting in the tendency to choke the absorber, as above noted.

The object of the present invention is to devise an inexpensive method of recovering cyanide from cyanide solutions, without loss of acid or acid anhydride or necessity for excessive use of absorbing alkali, and without liability of choking the absorber or other apparatus by the formation of insoluble deposits therein.

With this object in view, the present invention consists in the method of recovering cyanide as hereinafter described and particularly defined in the claims.

In the accompanying drawings, Fig. 1 is a flow sheet showing the preferred embodiment of the invention in the recovery of cyanide from cyanide solutions, and Fig. 2 is a detail view of the precipitating tank.

The preferred embodiment of the invention is described as follows: The solution to be de-cyanided and consisting ordinarily of waste mill solution containing lime enters through a steady head tank of any usual or preferred form and is divided into two parts, the first indicated at 2 to be neutralized, and the second indicated at 4 to effect utilization of any values in the form of acids or acid anhydrides which may come over from the vaporizing operation as will hereinafter be more specifically described.

The portion 2 of the solution, which constitutes about 70% of the whole, is subjected to a neutralization or carbonating operation in a tower 6, conveniently termed a carbonator, into which the solution is admitted through a seal 7. The carbonator comprises a counter-current tower having the usual filling to effect an intimate counter-current contact between the descending solution and an ascending flow of carbon dioxide entering the bottom of the tower at 8. The carbon dioxide from lime kilns or other convenient source is admitted in only sufficient quantity to neutralize the protective alkalinity of the solution and not to cause any appreciable conversion of cyanide into hydrocyanic acid. The tower opens to the atmosphere at the top, as indicated at 10, to discharge the waste gases into the atmosphere, and the solution is discharged from the bottom of the tower through the solution seal 9 and the pipe 11 into a tank 12. The reaction in the carbonator follows Equation (1) above and the calcium carbonate, requiring time and surface for its precipitation, will not be precipitated in the carbonator to any appreciable extent, but will pass on to be collected in the tank 12. This tank consists of a large deep box or launder in which are suspended longitudinally a number of canvas strips 13. Upon the surface presented by these strips will be precipitated the insoluble calcium salts. The strips, being supported as shown, may be easily removed from the box for the purpose of renewal or cleansing.

The solution which is now neutralized and which contains the desired cyanides is passed into an acidifier 14 in which it contacts with an acid anhydride of much greater strength and less volatility than the carbon dioxide. In the preferred form of the invention, the acid anhydride reagent used for this purpose is sulphur dioxide gas which although being volatile to some extent is employed because of its cheapness as compared to the stronger acids such as sulphuric acid. The solution passing through the acidifier 14 contacts in intimate counter-current fashion with sulphur dioxide gas entering at the bottom of the tower at 16 and exhausting at the top of the tower at 18, the gas being generated in a sulphur burner of any usual or preferred form. The acidification in the tower 14 proceeds according to an equation similar to the following:

$2KCN + 2H_2O + SO_2 = 2HCN + H_2O + K_2SO_3$ (3)

The reaction represented by this equation is for the ideal condition of simple potassium cyanide in the solution. The reaction has two removable constituents in the form of volatile sulphur dioxide gas and the volatile hydrocyanic acid gas, existing on opposite sides of the equation. In order to bring about vaporization of the latter, the solution passes through a solution seal 19 into a vaporizer 20 which affords intimate counter-current contact with air entering the bottom of the tower at 22 and leaving at the top of the tower at 24. Owing to the fact that sulphur dioxide has a considerable vapor tension, some of it will necessarily pass off with the hydrocyanic acid gas, the amount of sulphur dioxide, however, being less than the carbon dioxide vaporized when the latter is used as the acidifying reagent. The actual amount of sulphur dioxide passing over with the hydrocyanic acid gas is somewhat greater than that which would be experimentally determined from the conditions assumed in Equation (3). In actual practice the presence of double cyanides such as the double cyanide of zinc and potassium alters the conditions to such an extent that a considerable quantity of sulphur dioxide will pass over with the hydrocyanic acid gas, this quantity, however, being found to be less than the amount of carbon dioxide which would contaminate the hydrocyanic acid gas if the reaction were carried out according to Equation (2).

In addition to the mixture of sulphur dioxide and hydrocyanic acid gas passing from the top of the vaporizer, there is a small amount of carbon dioxide existing therewith. This latter gas is present because of impurities in the original solution in the form of carbonates. Assuming potassium carbonate as the carbonate salt in the original solution, it will be seen that the sulphur dioxide in the acidifier will react therewith to form potassium sulphite and carbon dioxide according to the following equation:

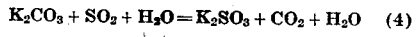

$$K_2CO_3 + SO_2 + H_2O = K_2SO_3 + CO_2 + H_2O \quad (4)$$

As previously stated, it is desirable not to admit the carbon dioxide and sulphur dioxide along with the hydrocyanic acid to the absorber not only because of the loss of valuable acid anhydride represented by the sulphur dioxide and carbon dioxide, but also because of the reaction with the absorbing alkali, requiring an excessive amount of the latter and causing precipitation of a deposit in the absorber. In order to bring about removal of these gases from the current of hydrocyanic acid use is made of an absorbing alkaline solution, which preferably comprises the portion of the mill solution indicated at 4 which is divided from the main part of the solution indicated at 2. This solution 4 enters through a seal 26 into a counter-current tower 28, the air current from the top of the vaporizer being passed through the pipe 24 into the bottom of the tower at 30. The tower 28, which I term an acid recuperator, is similar in construction to the vaporizer and consists of a counter-current apparatus having a height of about two feet of filling, the tower being conveniently mounted above the acidifier as shown in the drawing. The reaction of the solution entering at 26 with the gases entering at 30 is such as to absorb the sulphur dioxide and carbon dioxide gas completely from the air stream while permitting the hydrocyanic acid gas to emerge in a substantially pure state with the air current from a point near the top of the recuperating tower at 32. The action which takes place in the recuperator may be represented by the following equation:

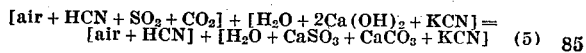

$$[air + HCN + SO_2 + CO_2] + [H_2O + 2Ca(OH)_2 + KCN] = \\ [air + HCN] + [H_2O + CaSO_3 + CaCO_3 + KCN] \quad (5)$$

On the left hand side, the first member in parenthesis represents the air and vapors emerging from the vaporizer and going to the acid recuperator where they are met by the compounds represented by the second member, consisting of a portion of the raw solution containing protective alkalinity in the form of calcium hydroxide. This protective alkalinity affords the means of scrubbing the gases of their sulphur dioxide and carbon dioxide content and is at the same time itself partially or wholly neutralized, resulting in the products of the right hand side of the equation, the first member of which represents the gas stream emerging from the recuperator and the second member the substances emerging from the recuperator which had had its alkalinity neutralized through the action of the acid and acid anhydride gases coming from the vaporizer. This neutralized solution containing its only remaining values in the form of cyanide salts passes through a liquid seal 29 and a pipe 34 into the tank 12. The calcium salts represented in the above equation as the carbonate and sulphite are insoluble, but because of their rapid movement in the recuperator they do not tend to precipitate therein, but pass with the liquid stream to join the solution which has been neutralized in the carbonator. The two parts of the solution which was originally divided, therefore, meet in the tank 12 where they are allowed sufficient contact with the screens 13 to permit precipitation of these insoluble salts, the two solutions together thereafter flowing to the acidifier through the pipe 15.

The air current bearing hydrocyanic acid gas which emerges from the point 32 of the recuperator, passes into an absorber 36 which is designed to afford a counter-current contact between the acid and an alkaline solution entering at 38 at the opposite end of the absorber. This alkaline solution preferably consists of an emulsion of lime which reacts with the hydrocyanic acid to form calcium cyanide. If desired, however, the absorbing alkali may conveniently consist of waste mill solution which, by virtue of its protective alkalinity, will absorb a certain amount of acid to raise the cyanide content of the solution. Where more concentrated solutions are desired, the alkali is admitted at 38 in a more concentrated form as an emulsion of lime or a solution of potassium or sodium hydroxide. The cyanide salt in the form of calcium cyanide, if lime is used for the absorbent, is discharged from the absorber at 42 and the air is discharged at 40. The air may conveniently be returned to the blower 44 to be admitted into the vaporizer at the point 22, thus preventing loss of any values which may be entrapped in the air stream in the form of cyanides.

It will be seen that the present invention provides five steps, namely, (1) neutralization by which the protective alkalinity of the solution is neutralized by a cheap and readily obtained acid, or acid anhydride preferably the acid anhydride carbon dioxide, (2) acidification, by which the neutralized solution has its cyanides converted into hydrocyanic acid by a relatively strong and nonvolatile acid, or acid anhydride, such as the acid anhydride sulphur dioxide, (3) vaporization, by which the hydrocyanic acid gas is driven from the solution, (4) acid recuperation, by which the sulphur and carbon dioxides are removed from the current of hydrocyanic acid gas, at the same time affording a means of neutralizing the protective alkalinity of a portion of the raw solution, and (5) absorption, by which the hydrocyanic acid gas is absorbed in an alkali without wastage of valuable acids or liability of choking the absorber.

What is claimed is:

1. The method of recovering cyanide from cyanide soultions containing alkali which consists in treating the solution with carbon dioxide to neutralize the alkali, treating the neutralized solution with sulphur dioxide to form hydrocyanic acid, vaporizing the hydrocyanic acid by passing a current of air therethrough, and passing the hydrocyanic acid gas through an alkali to absorb the hydrocyanic acid and form a cyanide salt.

2. The method of recovering cyanide from cyanide solutions containing lime which consists in treating the solution with carbon dioxide to neutralize the alkalinity and precipitate lime salts therefrom, treating the neutralize solution with sulphur dioxide to form hydrocyanic acid, vaporizing the hydrocyanic acid, and absorbing the hydrocyanic acid gas in an alkaline to form a cyanide.

3. The method of recovering cyanide from cyanide solutions which consists in acidifying the solution to form hydrocyanic acid, passing a current of air through the acidified solution, treating the current of air by brief contact with an alkaline solution to remove foreign acid constituents without appreciable neutralization of hydrocyanic acid, and thereafter subjecting the current of air to prolonged intimate contact with an alkaline solution to absorb the hydrocyanic acid.

4. The method of recovering cyanide from cyanide solutions which consists in converting their cyanide content to hydrocyanic acid, vaporizing the hydrocyanic acid and other vaporizable acid constituents, treating the resultant mixed vapors to free them of said other vaporizable acid constituents, and absorbing the hydrocyanic acid gas freed of said other acid constituents in an alkali to form a cyanide.

5. The method of recovering cyanide from cyanide solutions which consists in treating the solution with an acid which is strong relative to the hydrocyanic acid, absorbing any of the relatively strong acid passing over with the hydrocyanic acid gas in a solution of a composition similar to the original cyanide solution, and passing the air current containing the hydrocyanic acid gas into contact with an alkali to form a cyanide salt.

6. The method of recovering cyanide from cyanide solutions containing alkali and salt impurities which consists in treating the solution with an acid which is strong relative to the hydrocyanic acid to form hydrocyanic acid, and to liberate acids or acid anhydrides of the salt impurities, passing the solution into contact with a current of air, absorbing the relatively strong acid and the acids or acid anhydrides of the salt impurities in the original cyanide solution, and absorbing the hydrocyanic acid gas remaining in the air current in an alkali to form a cyanide salt.

7. The method of recovering cyanide from cyanide solutions containing alkali and carbonates which consists in treating the solution with sulphur dioxide to form hydrocyanic acid and carbon dioxide, vaporizing the hydrocyanic acid from the solution in a current of air, passing the air current into contact with the original solution to absorb any sulphur dioxide and any carbon dioxide in the alkali of the solution, and absorbing the hydrocyanic acid gas remaining in the air current in an alkali to form a cyanide salt.

8. The method of recovering cyanide from cyanide solutions which consists in dividing the solution, acidifying one portion thereof and vaporizing therefrom in a current of air the hydrocyanic acid formed, passing the air current into contact with the other portion of the cyanide solution to absorb any acid other than hydrocyanic acid in the air current, absorbing the hydrocyanic acid in an alkali to form a cyanide salt, and thereafter acidifying the second portion of the solution to form hydrocyanic acid therefrom.

9. The method of recovering cyanide from cyanide solutions containing an alkali and carbonates which consist in dividing the solution into two portions, treating one portion with carbon dioxide to neutralize the alkali, treating it with sulphur dioxide to form hydrocyanic acid and carbon dioxide, passing a current of air through the solution to vaporize the hydrocyanic acid and also carbon dioxide and sulphur dioxide, passing the air current through the remaining portion of the original cyanide solution to utilize its sulphur dioxide and carbon dioxide content by neutralization of the alkali of the solution, absorbing the remaining hydrocyanic acid in an alkaline solution to form a cyanide, and thereafter passing said remaining portion of the original solution into contact with the sulphur dioxide.

In testimony whereof I have signed my name to this application.

RUSSELL R. BRYAN.